(12) United States Patent
Hong et al.

(10) Patent No.: US 10,235,416 B2
(45) Date of Patent: Mar. 19, 2019

(54) METHOD FOR CONTROLLING A SEAT BY A MOBILE DEVICE, A COMPUTER PROGRAM PRODUCT, AND A SYSTEM

(71) Applicant: National Taiwan Normal University, Taipei (TW)

(72) Inventors: Jon-Chao Hong, Taipei (TW); Kai-Hsiang Yang, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 21 days.

(21) Appl. No.: 15/152,040

(22) Filed: May 11, 2016

(65) Prior Publication Data
US 2016/0332586 A1 Nov. 17, 2016

(30) Foreign Application Priority Data
May 15, 2015 (TW) .............................. 104115576 A

(51) Int. Cl.
*G06F 17/30* (2006.01)
*B60N 2/02* (2006.01)
*H04W 4/80* (2018.01)

(52) U.S. Cl.
CPC ......... *G06F 17/30477* (2013.01); *B60N 2/02* (2013.01); *B60N 2/0228* (2013.01); *B60N 2/0248* (2013.01); *H04W 4/80* (2018.02)

(58) Field of Classification Search
CPC .... B60N 2/002; B60N 2/0232; B60N 2/0248; B60N 2002/0268; B60N 2002/0272; B60N 2/0244; B60N 2/0276; B60N 2/28; B60N 2/2806; B60N 2/2863; B60N 2/4829; B60N 2/4852; B60N 2/4885; B60R 16/037; B60R 21/01516; B60R 21/0152; B60R 21/01552; B60R 2001/1253; B60R 2021/0027; B60R 2021/01315; B60R 2021/23153; B60R 2021/26094; B60R 2021/2765; B60R 2022/208; B60R 21/0132; B60R 21/0134; B60R 21/0136; B60R 21/01512; B60R 21/0153; B60R 21/01534; B60R 21/01536; B60R 21/01538; B60R 21/01542; B60R 21/01544; B60R 21/01548;
(Continued)

(56) References Cited

U.S. PATENT DOCUMENTS 7,430,467 B2 * 9/2008 Borke .................. B60N 2/0248 177/1
7,477,970 B2 * 1/2009 Bruelle-Drews .... B60N 2/0244 307/10.1

(Continued)

*Primary Examiner* — Abby Y Lin
*Assistant Examiner* — Sanjeev Malhotra
(74) *Attorney, Agent, or Firm* — Hamre, Schumann, Mueller & Larson, P.C.

(57) ABSTRACT

A method for controlling a seat is performed by a mobile device in cooperation with a database. The database contains at least one reference data set which contains a physical characteristic data and a seat setting data. The method includes the steps of: a) upon receipt of an input, searching the database to identify which one(s) of the at least one reference data set contains the physical characteristic data that matches the input, the one(s) serving as candidate data set(s); and b) when a total number of the candidate data set(s) identified in step a) is one, outputting, to the seat, the seat setting data contained in the candidate data set for controlling the seat.

9 Claims, 2 Drawing Sheets

(58) Field of Classification Search
CPC ........ B60R 21/01554; B60R 21/21656; B60R 21/276; B60R 22/20; B60R 25/25; B60R 25/255; G60K 9/00362; G60K 9/00832; B60K 35/00; B60K 37/06; B60L 15/20; B60W 40/09; B64D 11/06; G01S 13/04; G01S 15/87; G01S 15/88; G01S 17/88; G01S 17/89; G01S 7/417; G01S 7/539; G06F 3/0482; G06F 3/04842; G10K 2210/1282; G10K 2210/3219; H04L 67/12; H04N 21/41422; Y02T 10/645; Y02T 10/7275

USPC ............ 701/1, 2, 3, 22, 36, 45, 49, 14, 532; 200/200; 297/217.1, 217.3, 344.1; 318/461; 180/305; 725/26; 340/438, 340/539.26; 307/10.1; 177/1; 310/68 R

See application file for complete search history.

(56) References Cited

U.S. PATENT DOCUMENTS

| | | | | |
|---|---|---|---|---|
| 8,505,671 B1* | 8/2013 | Mohns | ................ | B60K 7/0015 180/305 |
| 8,585,146 B1* | 11/2013 | Giasson | ............... | B60N 2/0747 297/344.1 |
| 9,147,296 B2* | 9/2015 | Ricci | ...................... | H04W 4/21 |
| 2003/0105570 A1* | 6/2003 | Basir | ................ | B60R 21/01516 701/45 |
| 2004/0129543 A1* | 7/2004 | Voltz | .................... | A47C 31/008 200/200 |
| 2006/0103193 A1* | 5/2006 | Kramer | ................. | B64D 11/06 297/217.3 |
| 2006/0149426 A1* | 7/2006 | Unkrich | ............... | B60R 25/255 701/1 |
| 2008/0024296 A1* | 1/2008 | Jeong | ................... | B60R 16/037 340/539.26 |
| 2008/0051957 A1* | 2/2008 | Breed | ............... | B60R 21/01552 701/36 |
| 2008/0125921 A1* | 5/2008 | Baxter | ................... | G01C 23/00 701/3 |
| 2008/0195261 A1* | 8/2008 | Breed | ................ | B60R 21/0132 701/2 |
| 2009/0012678 A1* | 1/2009 | Cho | ....................... | B60N 2/002 701/45 |
| 2009/0055055 A1* | 2/2009 | Schussler | ............ | B60N 2/0244 701/49 |
| 2010/0070132 A1* | 3/2010 | Doi | ........................ | B60L 15/20 701/36 |
| 2011/0137558 A1* | 6/2011 | Lu | ........................... | G01C 21/30 701/532 |
| 2011/0172886 A1* | 7/2011 | Taira | ....................... | A61G 5/04 701/49 |
| 2011/0266991 A1* | 11/2011 | Diehl | ................... | B60N 2/0232 318/461 |
| 2012/0299344 A1* | 11/2012 | Breed | ..................... | B60J 10/00 297/217.1 |
| 2013/0013134 A1* | 1/2013 | Lieu | ...................... | G06Q 10/04 701/14 |
| 2013/0144474 A1* | 6/2013 | Ricci | ...................... | H04W 4/90 701/22 |
| 2014/0053185 A1* | 2/2014 | Bleacher | .......... | H04N 21/41422 725/26 |
| 2014/0225724 A1* | 8/2014 | Rankin | ................... | G06F 3/048 340/438 |
| 2014/0265749 A1* | 9/2014 | Motoda | ................. | H02K 5/225 310/68 R |
| 2015/0232045 A1* | 8/2015 | Colella | ................ | B60R 16/023 701/49 |
| 2017/0099295 A1* | 4/2017 | Ricci | ...................... | H04W 4/21 |

\* cited by examiner

METHOD FOR CONTROLLING A SEAT BY A MOBILE DEVICE, A COMPUTER PROGRAM PRODUCT, AND A SYSTEM

CROSS-REFERENCE TO RELATED APPLICATION

This application claims priority of Taiwanese Patent Application No. 104115576, filed on May 15, 2015.

FIELD

The disclosure relates to a method, and more particularly to a method for controlling a seat to be performed by a mobile device, a computer program product, and a system for controlling a seat.

BACKGROUND

It is often a trial and error process to adjust the position of a conventional seat, e.g., a car seat, a massage chair, until one finds what feels right.

SUMMARY

An object of the disclosure is to provide a method for controlling a seat through use of a mobile device.

According to one aspect of the disclosure, a method for controlling a seat is to be performed by a mobile device in cooperation with a database. The database contains at least one reference data set which contains a physical characteristic data, and a seat setting data. The method includes the steps of: a) upon receipt of an input, searching the database to identify which one(s) of the at least one reference data set contains the physical characteristic data that snatches the input, the one(s) serving as candidate data set(s); and b) when a total number of the candidate data set(s) identified in step a) is one, outputting, to the seat, the seat setting data contained in the candidate data set for controlling the seat.

According to another aspect of the disclosure, there is provided a computer program product, comprising a non-volatile computer readable storage medium that includes program instructions, which when executed by an electronic device, cause the electronic device to perform the aforesaid method.

According to yet another aspect of the disclosure, a system for controlling a seat includes a mobile device capable of establishing communication with a database containing at least one reference data set which contains a physical characteristic data and a seat setting data. The mobile device includes an input unit for receiving an input, a processor electrically connected to the input unit, and an output unit electrically connected to the processor. The processor is configured to search, upon receipt of the input, the database to identify which one(s) of the at least one reference data set contains the physical characteristic data that matches the input, the one(s) serving as candidate data set(s). The processor is further configured to control the output unit to output to the seat, when a total number of the candidate data set(s) thus identified is one, the seat setting data contained in the candidate data set for controlling the seat.

BRIEF DESCRIPTION OF THE DRAWINGS

Other features and advantages of the disclosure will become apparent in the following detailed description of the embodiment(s) with reference to the accompanying drawings, of which.

DERAILED DESCRIPTION

Figure 1:
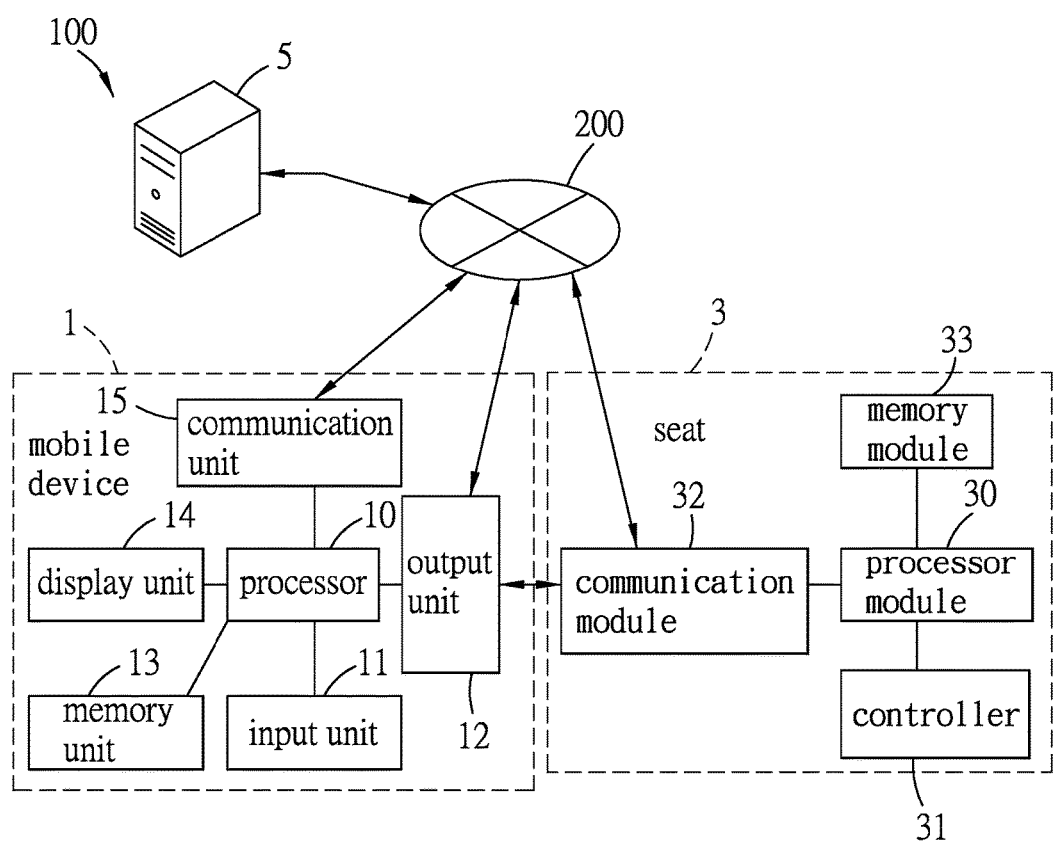
FIG. 1 is a block diagram illustrating an embodiment of a system for controlling a seat according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a system 100 for controlling a seat 3 according to this disclosure is described below. The system 100 includes a mobile device 1 and a database 5. The database 5 contains at least one reference data set which contains a physical characteristic data and a seat setting data.

The seat setting data may be associated with at least one of the following seat settings of the seat 3: a front-rear displacement of the seat 3 relative to the seat 3 in a reference state; an inclination angle of a back (not shown) of the seat 3 relative to the seat 3 in the reference state; an inclination angle of a seat body (not shown) of the seat 3 relative to the seat 3 in the reference state; an orientation/position of an armrest, (not shown) of the seat 3 relative to the seat 3 in the reference state; an up-down position of the seat 3 relative to the seat 3 in the reference state; an orientation/position of a headrest (not shown) of the; seat 3 relative to the seat 3 in the reference state; an orientation/position of a leg rest (not shown) of the seat 3 relative to the seat 3 in the reference state, or the like.

The mobile device 1 is capable of establishing communication with the database 5. The mobile device 1 includes an input unit 11 for receiving an input, a processor 10 electrically connected to the input unit 11, a memory unit 13 electrically connected to the processor 10, a display unit 14 electrically connected to the processor 10, an output unit 12 electrically connected to the processor 10 and capable of communicating with the seat 3, and a communication unit 15 electrically connected to the processor 10 and capable of communicating with the database 5. The seat 3 is operable in one of a manual mode and a smart mode. Operation under the manual mode allows a user of the seat 3 to manually adjust seat setting(s) of the seat 3 in a conventional manner. Since such should be readily appreciated by one of ordinary skill in the art, details thereof are omitted herein for the sake of brevity. Operation under a smart mode will be explained in subsequent paragraphs of this disclosure.

Figure 2:
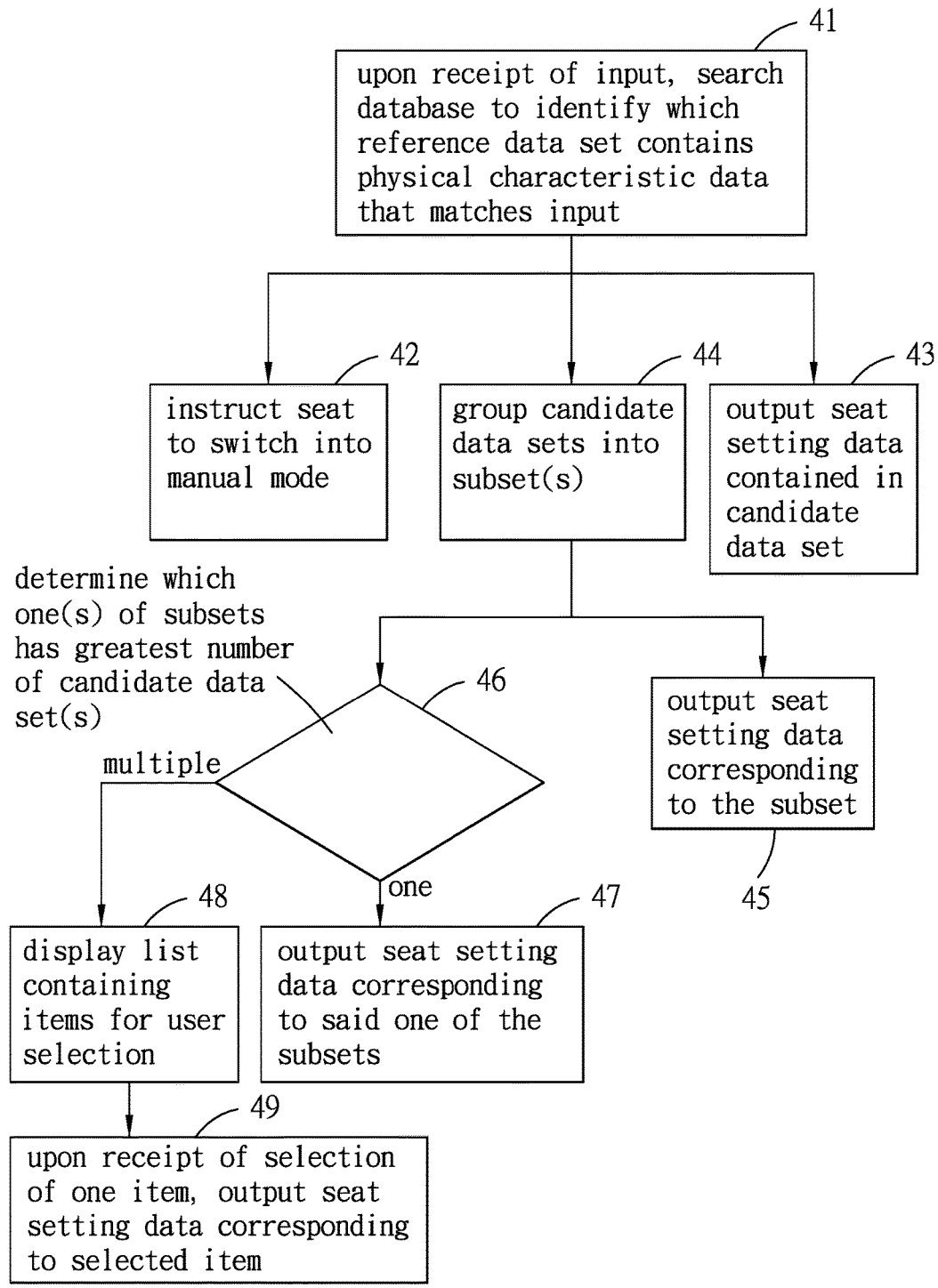
FIG. 2 is a flow chart illustrating an embodiment of a method for controlling a seat by a mobile device according the disclosure.

Referring to FIG. 2, an embodiment of a method for controlling the seat 3 by the mobile device 1 in cooperation with the database 5 according to this disclosure includes steps 41-49. It is noted that the communication unit 15 of the mobile device 1 has established communication with the database 5 via, e.g., a network 200, in advance, and that the seat 3 operates in the smart mode before the flow of the method begins.

In step 41, upon receipt via the input unit 11 of the mobile device 1, of an input, the processor 10 of the mobile device 1 searches the database 5 to identify which one(s) of the at least one reference data set contains the physical characteristic data that matches the input. The one(s) identified in step 41 serves as candidate data set(s). Herein, each, of the input and the physical characteristic data may be at least one of a height of a user, a weight of a user, or a body size/type of a user, or the like. For instance, in an example, the input is 174 cm (in height).

In one embodiment, the database 5 contains a plurality of the reference data sets. For simplicity of illustration, the seat setting data in the following description is associated with the seat setting of an inclination angle of a back (not shown) of the seat 3 relative to the seat 3 in the reference state.

When there is no candidate data set (i.e., no match in the database 5 is found for the input in step 41), the flow proceeds to step 42, where the processor 10 of the mobile device 1 instructs the seat 3 to switch into the manual mode from the smart mode.

When there is only one candidate data (i.e., a total number of the candidate data set(s) identified in step 41 is one), the flow goes to step 43, in which the processor 10 of the mobile device 1 outputs, via the output unit 12 to the seat 3, the seat setting data contained in the candidate data set fox controlling the seat 3. For instance, if the candidate data set is (174 cm, 10 degrees), the mobile device 1 outputs the seat setting data of 10 degrees to the seat 3 so that the seat 3 is controlled to adjust its back to be inclined by 10 degrees with respect to the seat 3 in the reference state.

When there are multiple candidate data sets (i.e., the total number of the candidate data set(s) is greater than one), the flow goes to step 44. In an example, the candidate data sets identified in step 41 are (174 cm, 10 degrees), (174 cm, 15 degrees), (174 cm, 20 degrees), (174 cm, 15 degrees), and (174 cm, 10 degrees). In step 44, the processor 10 of the mobile device groups the candidate data sets into subset(s) based on the seat setting data thereof in such a way that the seat setting data of the candidate data set(s) in each of the subset(s) are identical. For instance, in the above example, the two candidate data sets of (174 cm, 10 degrees) are grouped together in a first subset (i.e., there are two members in this subset corresponding to 10 degrees), and the two candidate data sets of (174 cm, 15 degrees) are grouped together in a second subset, while the one candidate data set of (174 cm, 20 degrees) is grouped into a third subset.

When there is only one subset (i.e., the total number of the subset(s) is one), meaning that all identified candidate data sets are associated with the same seat setting, the flow goes to step 45, where the processor 10 of the mobile device 1 outputs, via the output unit 12 to the seat 3, the seat setting data corresponding to the subset for controlling the seat 3.

When there are multiple subsets (i.e., the total number of the subset(s) is greater than one), the flow goes to step 46, where the processor 10 of the mobile device 1 determines which one(s) of the subsets has a greatest number of candidate data set(s).

When a total number of the one(s) of the subsets having the greatest number of candidate data set(s) is one, meaning that there is e.g., a most "preferred" setting in accordance with the database 5, the flow goes to step 47, where the processor 10 of the mobile device 1 outputs, via the output unit 12 to the seat 3, the seat setting data corresponding to said one of the subsets.

When the total number of the one(s) of the subsets having the greatest number of candidate data set(s) is greater than one, the flow goes to step 48, where the processor 10 of the mobile device 1 displays on the display unit 14 a list containing a plurality of items for user selection, with each of the items corresponding to the seal seating data that corresponds to a corresponding one of the ones of the subsets. For instance, in the above-given example, two items are displayed, one corresponding to (174 cm, 10 degrees) and the other corresponding to (174 cm, 15 degrees). The items may, for example, read "10 degrees" and "15 degrees", respectively, but this disclosure is not limited to the format of the displayed items. Then, the flow goes to step 49, where, upon receipt via the input unit 11 of selection of one: of the items, the processor 10 of the mobile device 1 outputs, via the output unit 12 to the seat 3, the seat setting data that corresponds to the (selected) one of the items for controlling the seat 3.

In another embodiment of this disclosure, steps 47-49 may be omitted, and in step 46, instead of determining which one(s) of the substrate has a greatest number of candidate set(s), the processor 10 of the mobile device 1 displays on the display unit 14 a list containing a plurality of items for user selection, with each of the items corresponding to the seat setting data that corresponds to a corresponding one of the subsets, followed by output ting to the seat 3 the seat setting data corresponding to a user selected item for controlling the seat 3, similar to step 49 of FIG. 2. Using the aforesaid example for illustration, in such embodiment, there are displayed three items, respectively corresponding to (174 cm, 10 degrees), (174 cm, 15 degrees) and (174 cm, 20 degrees).

Alternatively, in another embodiment, steps 45-49 may be omitted, and in step 44, instead of grouping the candidate data sets into subset(s), the processor 10 of the mobile device 1 displays on the display unit 14 a list containing a plurality of items for user selection, with each of the items corresponding to the seat setting data contained in a corresponding one of the candidate data sets, followed by outputting, via the output unit 12 to the seat 3, the seat setting data that corresponds to the selected item for controlling the seat 3, similar to step 49 of FIG. 2. For instance, in the above-given example, the list would contain five items, respectively corresponding to (174 cm, 10 degrees), (174 cm, 15 degrees), (174 cm, 20 degrees), (174 cm, 15 degrees), and (174 cm, 10 degrees).

In another embodiment of this disclosure, the method further includes a step of establishing the database 5 prior to step 41. An example will be given later with regard to how to establish the database 5.

In an embodiment, the seat 3 includes a processor module 30, and a controller 31, a communication module 32 and a memory module 33 each electrically connected to the processor module 30. The controller 31 is configured to adjust position of the seat 3 according to a driving command. The processor module 30 is configured to generate a seat setting data by sensing the position of the seat 3 relative to the seat 3 in the reference state. The communication module 32 may be capable of at least one of establishing a short distance communication (e.g., near field communication) with the output unit 12, or establishing communication with the database 5 over a network 200.

In one embodiment, the database 5 may be gradually established by user(s) over time through adjusting the seat 3 when the seat 3 operates in the manual mode. Alternatively, the database 5 may be pre-established in, e.g., a factory, and/or updated and maintained by a manufacturer. Several modes of operation may be implemented to store a reference data set in the database 5 via use of the mobile device 1, the seat 3, or a combiner, ion thereof. Five exemplary modes of operation are provided below.

In a first mode of operation, the user inputs physical characteristic data (e.g., 174 cm) via the input unit 11 of the mobile device 1, and adjusts the position of the seat 3 by inputting a driving command to the controller 31 (through, for instance, operating a control panel (not shown) or an electric control button, etc.). Meanwhile, the mobile device 1 transmits the physical characteristic data via the output unit 12 to the communication module 32 of the seat 3, for example, via short distance communication, and the processor module 30 of the seat 3 generates the seat setting data by sensing the position of the seat 3. Next, the processor module 30 associates the seat setting data with the physical characteristic data received from the mobile device 1 in order to generate a data set. The communication module 32 of the seat 3 then outputs the data set to the database 5 via the network 200 to be stored therein as a reference data set.

In a second mode of operation, the user inputs physical characteristic data to the seat 3, and adjusts the position Of the seat 3 by inputting the driving command to the controller 31. The processor module 30 of the seat 3 generates the seat setting data by sensing the position of the seat 3, and associates the seat setting data with the physical characteristic data in order to generate a data set. The communication module 32 of the seat 3 then outputs the data set to the database 5 via the network 200 to be stored therein as a reference data set.

A third mode of operation is similar to the second mode of operation, and differs therefrom in that after the processor module 30 of the seat 3 generates the data set, the seat 3 transmits the data set via the communication module 32 to the output unit 12 of the mobile device 1, and it is the communication unit 15 of the mobile device 1 that outputs the data set to the database 5 over the network 200 for storage therein.

In a fourth mode of operation, the user inputs the physical characteristic data and the driving command to the input unit 11 of the mobile device 1. The physical characteristic data and the driving command are then both transmitted to the communication module 32 of the seat 3 by the output unit 12 of the mobile device 1. The controller 31 of the seat 3 then adjusts the position of the seat 3 according to the driving command. Next, the processor module 30 of the seat 3 generates the seat setting data by sensing the position of the seat 3, and associates the seat setting data in the physical characteristic data in order to generate a data set, which is to be transmitted to the mobile device 1 for output to the database 5 by the mobile device 1.

In a fifth mode of operation, the user inputs the physical characteristic data and the seat setting data to the input unit 11 of the mobile device 1. The physical characteristic data and the seat setting data are then transmitted to the seat 3 by the output unit 12 of the mobile device 1. Upon receipt of the seat setting data by the communication module 32, the processor module 30 of the seat 3 converts the seat setting data into a driving command based on for instance, a current position of the seat, and outputs the driving command to the controller 31, which then adjusts the seat 3 accordingly. Meanwhile, the processor module 30 associates the seat setting data with the physical characteristic data in order to generate a data set to be outputted to the database 5 by the communication module 32. Alternatively, the processor 10 of the mobile device 1 may associate the physical characteristic data with the seat setting data and generate a data set, which is to be outputted directly to the database 5 to be stored as a reference data set therein without being transmitted to the seat 3 for controlling the seat 3.

In each of the exemplary modes of operation, the data set may also be stored in the memory unit 13 of the mobile device 1 and/or the memory module 33 of the seat 3.

According to one embodiment of this disclosure, the method may be implemented using a computer program product including a non-volatile computer readable storage medium that includes program instructions, which when executed by an electronic device, cause the electronic device to perform the method.

In sum, this disclosure provides the user with an option of having the seat 3 be automatically adjusted in accordance with an inputted physical characteristic data (i.e., the input) entered via the mobile device 1, and an option of manually adjusting the seat 3 in a conventional manner. With the database 5 being updated and gradually established by the user(s) of the seat 3, it is possible to have the seat 3 automatically adjusted. to a more preferable seat setting. Alternatively, the user may be given several seat settings to choose from upon entering the input.

In the description above, for the purposes of explanation, numerous specific: details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for controlling a seat, comprising:
    a mobile device; and
    a database containing at least one reference data set which contains a physical characteristic data and a seat setting data, said mobile device being capable of establishing communication with said database,
    said mobile device including an input unit for receiving a user input, a processor electrically connected to said input unit, and an output unit electrically connected to said processor, said processor being configured to:
    search, upon receipt of the user input, the database to identify which one(s) of the at least one reference data set contains the physical characteristic data that matches the user input, the one(s) serving as candidate data set(s), wherein each of the user input and the physical characteristic data includes at least one of a height of a user, a weight of the user, or a body size/type of the user, and the at least one reference data set includes a plurality of reference data sets, and the database is established, updated and maintained by a manufacturer;
    control the seat, when the total number of the candidate data set(s) is greater than one, group the candidate data sets into subset(s) based on the seat setting data thereof, the seat setting data of the candidate data set(s) in each of the subset(s) being identical;
        when a total number of the subset(s) is one, control said output unit to output to the seat the seat setting data corresponding to the subset for controlling the seat;

when a total number of the subset(s) is greater than one, determine which one(s) of the subsets has a greatest number of candidate data set(s); and
when a total number of the one(s) of the subsets having the greatest number of candidate data set(s) is one, control said output unit to output to the seat the seat setting data corresponding to the one of the subsets.

2. The system as claimed in claim 1, wherein:
said mobile device further includes a display;
said processor is further configured to, when the total number of the one(s) of the subsets having the greatest number of candidate data set(s) is greater than one, control said display to display a list containing a plurality of items for user selection, each of the items corresponding to the seat setting data corresponding to a corresponding one of the ones of the subsets; and
said processor is further configured to, upon receipt of selection of one of the items via said input unit, control said output unit to output, to the seat, the seat setting data that corresponds to the one of the items for controlling the seat.

3. The system of claim 1, wherein:
said mobile device further includes a communication unit capable of communicating with the database; and
said processor is further configured to, upon receipt, via said input unit, of a data set containing a physical characteristic data and a seat setting data, control said communication unit to transmit the data set to the database for the database to store the data set therein as a reference data set.

4. The system of claim 3, wherein:
said communication unit being further capable of communicating with the seat; and
said processor is further configured to, upon receipt, via said communication unit from the seat, of a data set containing a physical characteristic data and a seat setting data, control said communication unit to transmit the data set to the database for the database to store the data set therein as a reference data set.

5. The system of claim 1, the seat setting data being associated with at least one of
a front-rear displacement of the seat relative to the seat in a reference state;
an inclination angle of a back of the seat relative to the seat in the reference state;
an inclination angle of a seat body of the seat relative to the seat in the reference state;
an orientation/position of an armrest of the seat relative to the seat in the reference state;
an up-down position of the seat relative to the seat in the reference state;
an orientation/position of a headrest of the seat relative to the seat in the reference state; or
an orientation/position of a leg rest of the seat relative to the seat in the reference state.

6. A method for controlling a seat to be performed by a system that includes a mobile device, the method comprising the steps of:
a) establishing a database containing at least one reference data set which contains a physical characteristic data and a seat setting data, wherein the database is established, updated and maintained by a manufacturer;
b) upon receipt of a user input, searching the database to identify which one(s) of the at least one reference data set contains the physical characteristic data that matches the user input, the one(s) serving as candidate data set(s), wherein each of the user input and the physical characteristic data includes at least one of a height of a user, a weight of the user, or a body size/type of the user, and the at least one reference data set includes a plurality of reference data sets;
when the total number of the candidate data set(s) identified in step b) is greater than one, grouping the candidate data sets into subset(s) based on the seat setting data thereof, the seat setting data of the candidate data set(s) in each of the subset(s) being identical;
when a total number of the subset(s) is one, outputting, to the seat, the seat setting data corresponding to the subset for controlling the seat;
when a total number of the subset(s) is greater than one, determining which one(s) of the subsets has a greatest number of candidate data set(s); and
when a total number of the one(s) of the subsets having the greatest number of candidate data set(s) is one, outputting, to the seat, the seat setting data corresponding to the one of the subsets.

7. The method as claimed in claim 1, further comprising the steps of:
when the total number of the one(s) of the subsets having the greatest number of candidate data set(s) is greater than one, displaying a list containing a plurality of items for user selection, each of the items corresponding to the seat setting data corresponding to a corresponding one of the ones of the subsets; and
upon receipt of selection of one of the items, outputting, to the seat, the seat setting data that corresponds to the one of the items for controlling the seat.

8. The method of claim 1, wherein the seat setting data is associated with at least one of: a front-rear displacement of the seat relative to the seat in a reference state; an inclination angle of a back of the seat relative to the seat in the reference state; an inclination angle of a seat body of the seat relative to the seat in the reference state; an orientation/position of an armrest of the seat relative to the seat in the reference state; an up-down position of the seat relative to the seat in the reference state; an orientation/position of a headrest of the seat relative to the seat in the reference state; or an orientation/position of a leg rest of the seat relative to the seat in the reference state.

9. A computer program product, comprising a non-volatile computer readable storage medium that includes program instructions, which when executed by an electronic device, cause the electronic device to perform the method comprising:
a) establishing a database containing at least one reference data set which contains a physical characteristic data and a seat setting data, wherein the database is established, updated and maintained by a manufacturer;
b) upon receipt of a user input, searching the database to identify which one(s) of the at least one reference data set contains the physical characteristic data that matches the user input, the one(s) serving as candidate data set(s), wherein each of the user input and the physical characteristic data includes at least one of a height of a user, a weight of the user, or a body size/type of the user;
when the total number of the candidate data set(s) identified is greater than one, grouping the candidate data sets into subset(s) based on the seat setting data thereof, the seat setting data of the candidate data set(s) in each of the subset(s) being identical;

when a total number of the subset(s) is one, outputting, to the seat, the seat setting data corresponding to the subset for controlling the seat;

when a total number of the subset(s) is greater than one, determining which one(s) of the subsets has a greatest number of candidate data set(s); and when a total number of the one(s) of the subsets having the greatest number of candidate data set(s) is one, outputting, to the seat, the seat setting data corresponding to the one of the subsets.

* * * * *